United States Patent
Hansen

(10) Patent No.: US 8,154,394 B2
(45) Date of Patent: Apr. 10, 2012

(54) OCCUPANT SEAT DETECTION SYSTEM AND METHOD

(75) Inventor: Mark C. Hansen, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 462 days.

(21) Appl. No.: 12/433,993

(22) Filed: May 1, 2009

(65) Prior Publication Data

US 2009/0295554 A1 Dec. 3, 2009

Related U.S. Application Data

(60) Provisional application No. 61/126,120, filed on May 1, 2008.

(51) Int. Cl.
*B60Q 1/00* (2006.01)

(52) U.S. Cl. ...... 340/425.5; 340/506; 340/3.1; 340/933; 340/426.24

(58) Field of Classification Search .......... 340/425.5, 340/506, 3.1, 933, 426.24
See application file for complete search history.

(56) References Cited

U.S. PATENT DOCUMENTS

| | | | |
|---|---|---|---|
| 5,400,246 A * | 3/1995 | Wilson et al. ............ 700/17 |
| 5,914,610 A | 6/1999 | Gershenfeld et al. |
| 6,161,070 A | 12/2000 | Jinno et al. |
| 6,179,378 B1 | 1/2001 | Baumgartner et al. |
| 6,556,137 B1 | 4/2003 | Oka et al. |
| 6,559,555 B1 | 5/2003 | Saitou et al. |
| 6,644,689 B2 | 11/2003 | Murphy |
| 6,696,948 B2 | 2/2004 | Thompson et al. |
| 6,816,077 B1 | 11/2004 | Shieh et al. |
| 6,877,606 B2 | 4/2005 | Hardy |
| 6,960,841 B2 | 11/2005 | Saitou et al. |
| 7,048,338 B2 | 5/2006 | Pinkos |
| 7,084,763 B2 | 8/2006 | Shieh et al. |
| 7,102,527 B2 | 9/2006 | Shieh et al. |
| 7,151,452 B2 | 12/2006 | Shieh |
| 7,194,346 B2 | 3/2007 | Griffin et al. |
| 2004/0111201 A1 | 6/2004 | Thompson et al. |
| 2005/0253712 A1 | 11/2005 | Kimura et al. |
| 2006/0187038 A1 | 8/2006 | Shieh et al. |

FOREIGN PATENT DOCUMENTS

WO W09513204 5/1995

OTHER PUBLICATIONS

Pending U.S. Appl. No. 12/150,439, filed Apr. 28, 2008.
Pending U.S. Appl. No. 12/432,975, filed Apr. 30, 2009.
Pending U.S. Appl. No. 12/433,011, filed Apr. 30, 2009.
Pending U.S. Appl. No. 12/434,079, filed May 1, 2009.
Pending U.S. Appl. No. 12/433,923, filed May 1, 2009.

* cited by examiner

*Primary Examiner* — Daryl Pope
(74) *Attorney, Agent, or Firm* — Lawrence D. Hazelton

(57) ABSTRACT

An occupant system includes a sensing device disposed in a seat and an electronic device configured to acquire data from the sensing device. The electronic device includes a system controller which uses that data to determine an appropriate system response. Data is acquired in at least two different system configurations and in at least two different time periods. A data set is created which represents a comparison of data acquired in the different configurations and times. The elements of this data set are compared to each other to identify anomalous data and respond accordingly.

22 Claims, 5 Drawing Sheets

Control System

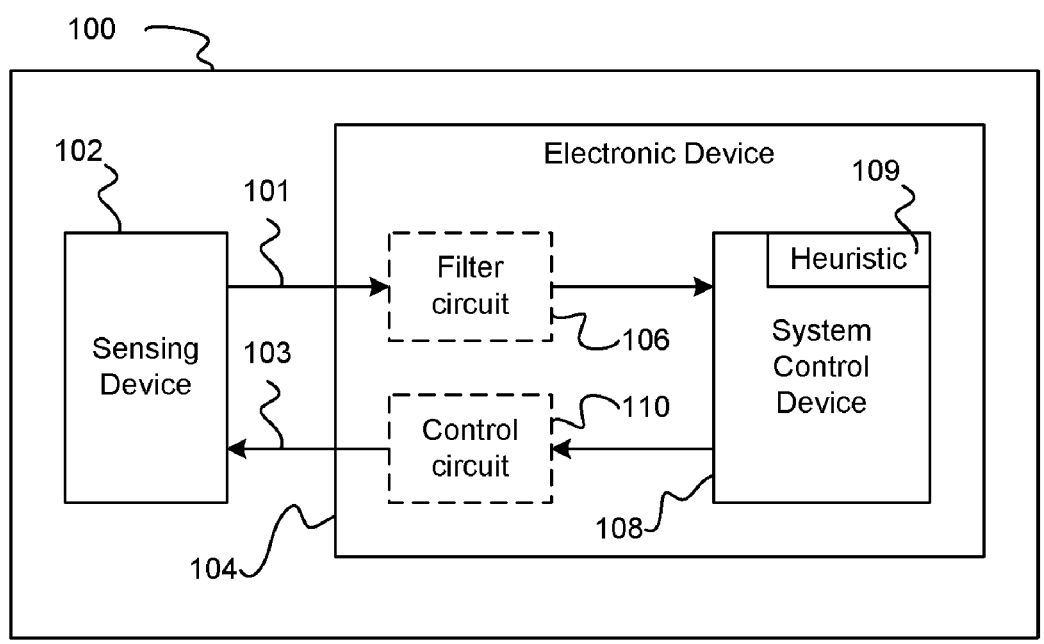
Figure 1. Control System

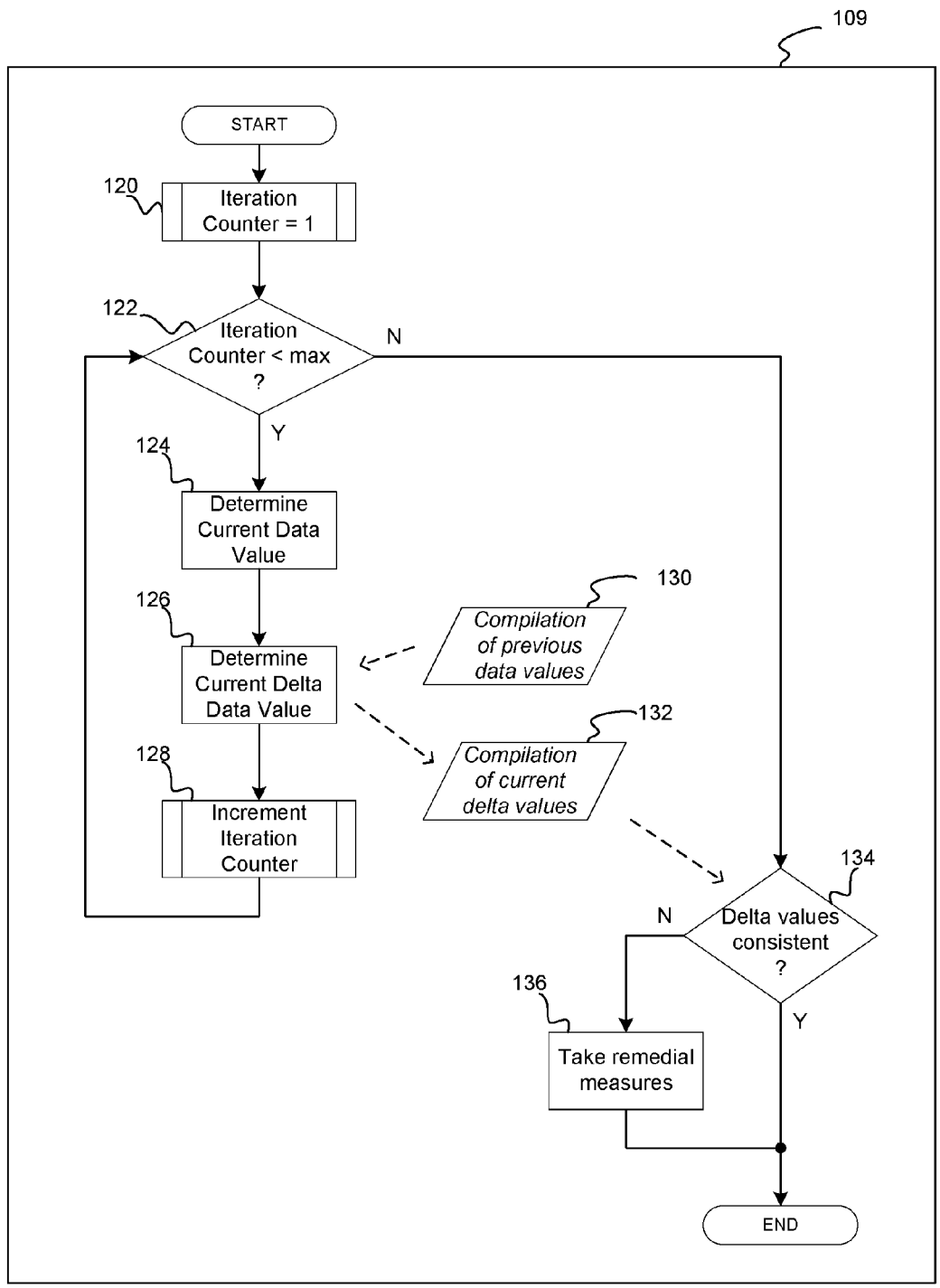
Figure 2. Heuristic for Acquiring and Verifying Data

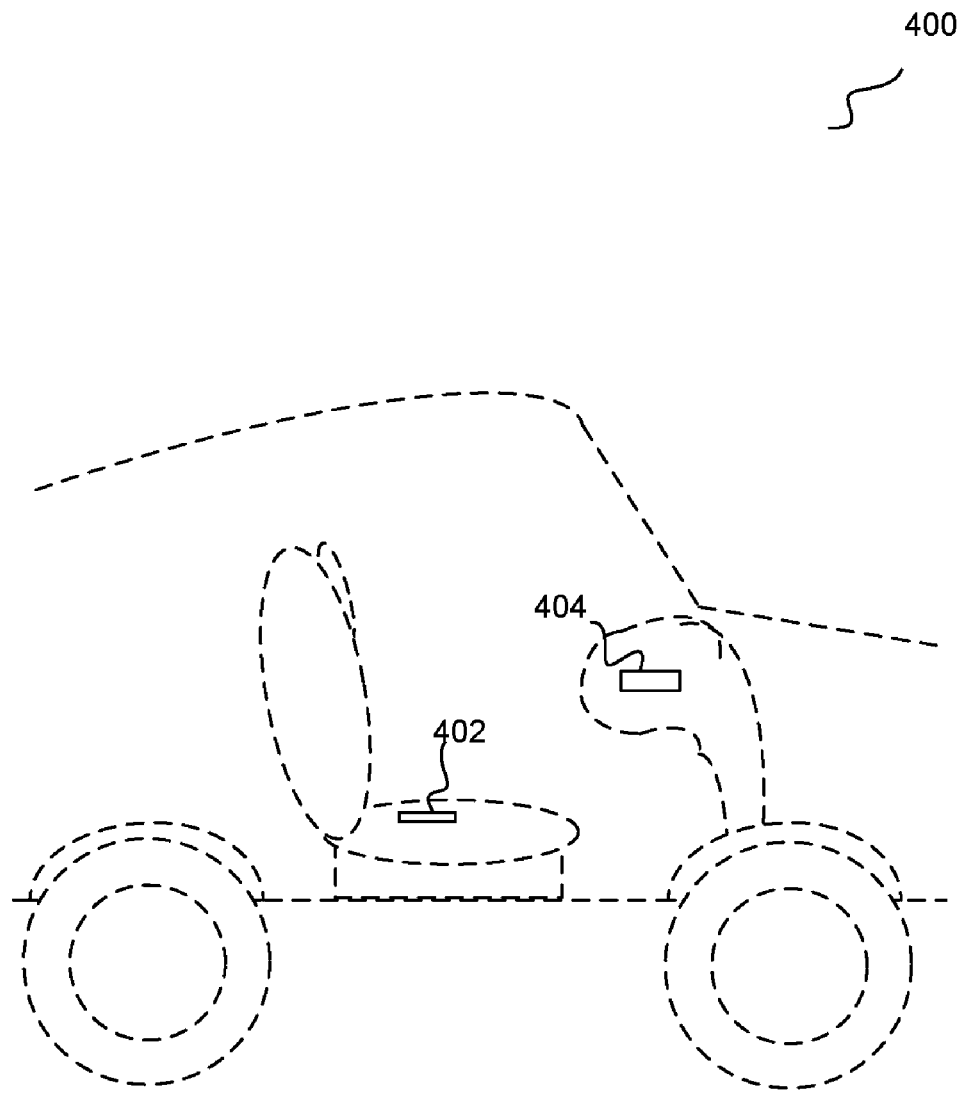
Figure 3. Exemplar Embodiment of Control System in a Vehicle

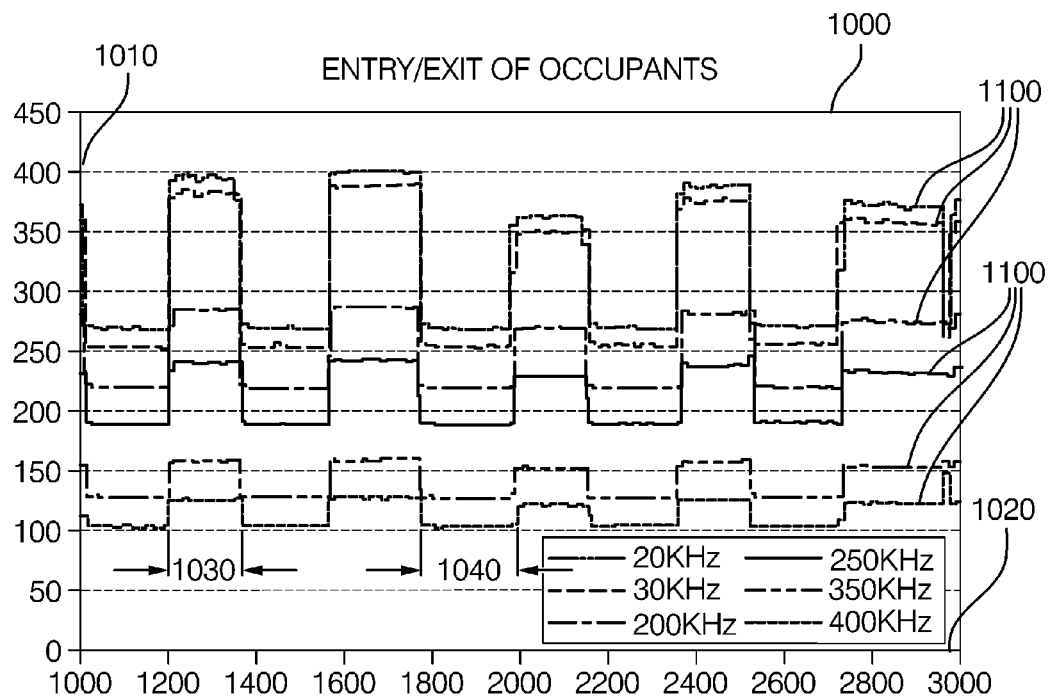
Figure 4A. Occupancy Changes
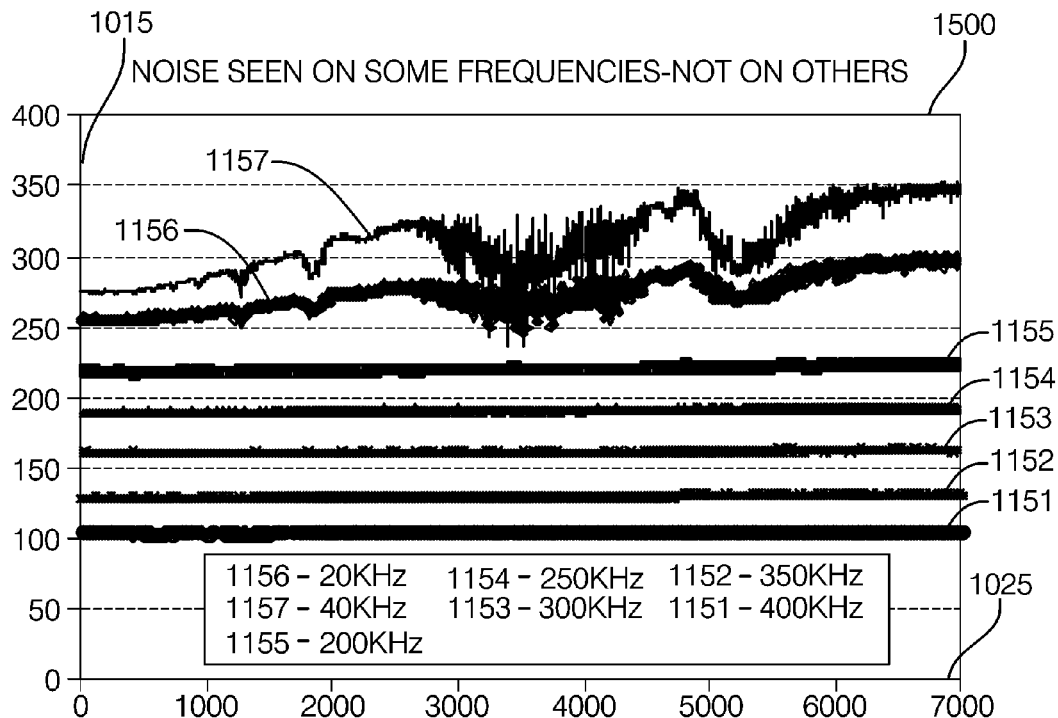
Figure 4B. Electrical Interference on Some Frequencies

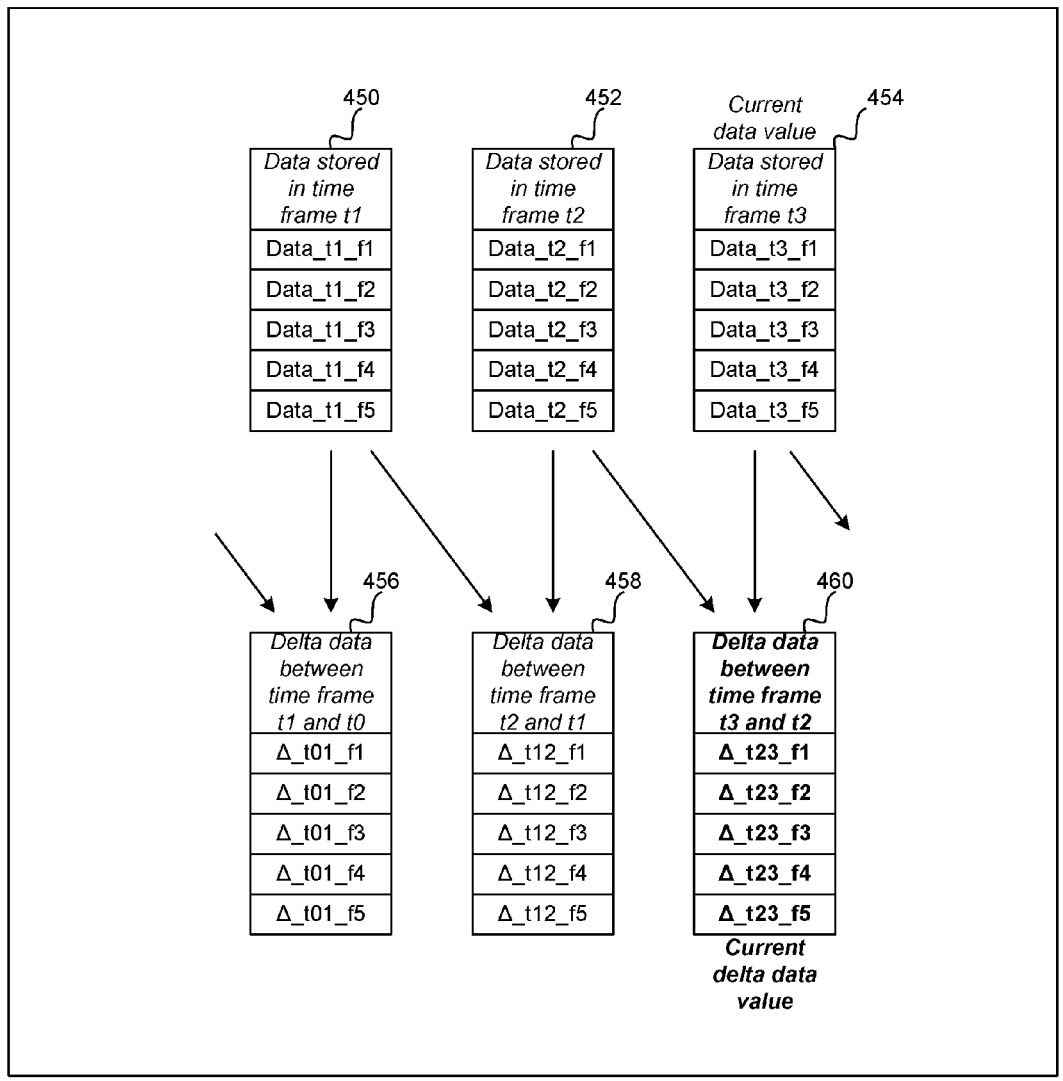
Figure 5. Example Using Five Frequencies, Data Tables

OCCUPANT SEAT DETECTION SYSTEM AND METHOD

RELATED APPLICATIONS

This application claims priority to U.S. provisional application 61/126,120, filed May 1, 2008, entitled "A SYSTEM AND METHOD FOR DETECTING AN OBJECT AT A LOCATION".

BACKGROUND OF THE INVENTION

Occupant detection systems have the ability to determine the presence and/or characteristics of an occupant at a specific location. However, environmental conditions, such as humidity and moisture, may interfere with the occupant detection system's readings. Although useful in a wide variety of industries, occupant detection systems may be used in automotive applications to determine whether a person is present in a vehicle, and if so, the size of the person. This information may be used for various purposes, including enabling/disabling an airbag system. In many vehicles, each seat has at least one corresponding airbag.

Generally, during an accident, the airbags are deployed so long as a person is detected in the corresponding seat. For this reason, the occupant detection system further determines the person's size before enabling/disabling the airbag system. Although occupant detection systems are generally reliable, environmental conditions like humidity in the air or moisture on the seat may interfere with the occupant detection system's ability to determine the person's presence or size. For instance, the humidity or moisture may cause some children or car seats to be mischaracterized as adults.

Accordingly, an occupant detection system is needed that compensates for environmental conditions, such as humidity and moisture, which may interfere with the occupant detection system's readings.

Sensing devices are generally used to monitor existing conditions in order to control systems or to predict future conditions. A known problem, however, is that sensing devices are susceptible to environmental interference, and in some cases, are not able to tolerate environmental interference. One solution is to incorporate a compensation mechanism into the system to minimize or eliminate the interference. For electrically-interfaced sensing devices, the output of the sensing device may be an input into an electronic system that interprets and uses the sensor information. The electronic system may be affected by environmental interference such as electromagnetic interference (EMI) or electrostatic discharge (ESD). An electronic system often includes a filtering circuit to keep these and other environmental interferences from damaging the electronic system.

Although the filtering circuit may protect the electronic system from damage, the filtering circuit may still allow non-damaging electrical interference to pass into the system. The non-damaging electrical interference can affect the operation of the system by introducing error into the information obtained from the sensing device. In some cases, additional filtering circuitry may be used to reduce such errors, but this additional circuitry can introduce other errors which may be equally undesirable.

One option for overcoming this problem is to perform digital filtering on the electrical signal coming from the sensing device. Digital filtering on a signal is effective for reducing the impact of transient electrical interference. However, such filtering may not be able to detect long duration electrical interference. A method for being able to detect long duration electrical interference is to acquire a sequence of electrical signals from the sensing device, wherein the acquired signals represent the system response to operation at different frequencies and wherein the sequence of signals is acquired at substantially the same time. Because most electrical interference generally affects only bands of frequencies and not the whole frequency spectrum, signal changes at one frequency and not at other frequencies tend to indicate electrical interference within a certain frequency band. By reading a sequence of signals generated at different frequencies, long duration electrical interference can be detected and overcome.

Although the method of acquiring signals over multiple frequencies is effective to filter out long duration electrical interference, it cannot detect certain types of electrical interference that occur during the acquisition of the sequence of signals at different frequencies, or during certain other stages of the acquisition process.

BRIEF SUMMARY OF THE INVENTION

An occupant seat detection system includes a control system having at least one sensing device and an electronic device configured to acquire data from the at least one sensing device. The electronic device includes a system control device which uses the data to determine an appropriate system response. The system is configured in at least two different ways and system response data is acquired in the different configurations. A set of system response data is compiled. A multiple of such compiled system response data sets are acquired in different time periods and these data sets are compared to each other to create at least one delta system response data set reflecting changes in data from one time period to the next. The system uses a heuristic for rejecting anomalous data by comparing individual elements within the delta system response data set to each other.

BRIEF DESCRIPTION OF THE DRAWINGS

FIG. 1 illustrates an exemplary control system according to an embodiment;

FIG. 2 illustrates an exemplary heuristic for acquiring and verifying data;

FIG. 3 illustrates an exemplary system of a vehicle occupant detection control system;

FIG. 4A illustrates signals received from a sensing device in an exemplary occupant detection control system;

FIG. 4B illustrates signals received from a sensing device in an exemplary control system;

FIG. 5 illustrates exemplary compilations resulting from application of the system heuristics of FIG. 2.

DETAILED DESCRIPTION OF THE INVENTION

A control system includes at least one sensing device and an electronic device. The sensing device is an electrical or electromechanical component within the system that is configured to monitor a system condition. The sensing device is configured to produce an electrical signal that corresponds to the system conditions in a predefined manner. The electronic device represents any set of electronic components configured together in a defined manner to perform a dedicated function or set of functions within a control system. In one exemplary approach, the electronic device includes a system control device. The system control device is an electronic component (or components) that is in electrical communication with the sensing device, and is capable of receiving and interpreting an electrical signal from the output of the sensing device. The system control device has the capability to digitally filter the electronic signal received from the sensing device. The system control device may also control the sensing device. The electronic device may also include a control circuit to control the sensing device, separately or in conjunction with the system control device. The electronic device may also include a filter circuit for protecting the system control device from damage due to electrical interference.

The sensing device output is an electrical signal with information regarding system conditions represented as a voltage or current level. The system control device monitors the signal as one input from which to make system control decisions. The system control device digitally filters the signal to reduce or eliminate errors caused by electrical interference.

The system control device recognizes transient interference and sustained interference electrically superimposed over the sensing device output signal. The system control device uses a detection heuristic to determine that interference exists, what type of interference it is, and how to adapt to the interference, if necessary. Transient interference is defined here as interference that, while it may materially affect the functionality of the system, its duration is short enough such that if detected, it can be ignored or isolated to minimize its affect on the input data. Sustained interference is defined here as interference that is not temporally short enough to be ignored or isolated by the system and significant enough to materially affect the functionality of the system.

Transient electrical interference may be from electromagnetic interference (EMI), electrostatic discharge (ESD), cross-talk (coupling) between electrical lines, switching noise when the sensing device or the device it is sensing is turned on or off, and many other sources of transient disturbance. By its nature transient electrical interference consists of generally very short duration transients as compared to the reaction time of the monitoring system. If the system is capable of detecting the presence of transient interference, it may ignore these transients until they pass.

Sustained electrical interference may be from nearby constantly-operating motors, RF or cellular towers, and many other sources of sustained disturbance. By its nature sustained electrical interference is of generally long duration as compared to the reaction time of the monitoring system and would therefore materially affect the accuracy of the information received. The system thus seeks to recognize sustained interference from transient interference and adapt if necessary.

Electrical interference detection is accomplished by the system control device by acquiring data from the sensing device in multiple system configurations and comparing the data to determine anomalous values. Alternatively or additionally, data may be acquired in the same system configurations again at a later time or times, and the sets of data compared. The type of system configuration described hereinafter is a configuration of operating frequency. The use of operating frequency as the parameter to configure is exemplary. The heuristics described herein apply equally to other types of system configurations.

The system is operated in a sequence of selected frequencies, in which the selected frequencies are stepped through in quick succession, e.g. at substantially the same time. Alternatively, the system is operated at one time with all of the selected frequencies present concurrently. At each selected frequency of operation, the system control device acquires and digitally filters the corresponding signal, and determines a signal value for that frequency. The system control device compiles the signal values acquired at all of the selected frequencies into a set of signal values for the sequence for that time. The signal values within the set may be compared to each other to determine anomalous values. At a later time, the system may be operated at the same frequencies and the system control device compiles another set of signal values. The system control device then compares the first and second sets of signal values to determine a set of signal value changes, and analyzes the set of signal value changes to determine if the changes are equal to each other within a predetermined threshold.

In one exemplary approach, the control system is an occupant detection system, e.g. in a vehicle. The occupant detection system detects the presence of an occupant in a seat as distinct from inanimate objects at rest upon the seat. The occupant detection system also detects the difference between an adult and a child occupying the seat. If there is no occupant in the seat and conditions are such that the airbag would normally be detonated, the occupant detection system recognizes that there is no occupant and that the airbag should not be detonated. If there is a child or a small person in the seat, the occupant detection system determines that the airbag should not be detonated or that it should be detonated with a lower charge.

In one embodiment of such an occupant detection system, a sensing device is located within the seat and the output of the sensing device is electrically connected to an electronic control unit within the vehicle. The electronic control unit is an example of an electronic device as described above. The sensing device broadcasts signals at selected frequencies. The electronic control unit acquires the system response from the sensing device at each frequency, in the form of a voltage. This signal acquisition is repeated with a predetermined periodicity. The control unit analyzes the sets of responses from each time period. For each frequency in the sequence of selected frequencies, the control unit determines a corresponding delta value between signal values from the two time periods. The control unit compares the delta values from all of the selected frequencies to each other, and depending upon the result of the comparison, the electronic control unit determines whether or not there has been a change of occupancy in the seat, e.g. a person entered or exited the seat. The delta values corresponding to a change of occupancy should be equivalent to each other within a predetermined threshold. Therefore, if the delta values are not consistent with each other, the system should not register a change of occupancy.

In another embodiment of the occupant detection system, the sensing device is first put into a "listen" mode to determine if there is electrical interference within the system and if not, the sensing device is put into a "receive" mode to acquire a signal value.

In both embodiments of an occupant detection system discussed above, a set of signal values from one time period alone might not indicate that the signal values contained error. The errors may only be discovered by comparing the set of signal values to a set or sets of signal values acquired at subsequent time(s).

FIG. 1 shows an embodiment of a control system 100 in which there is at least one sensing device 102, configured to produce at least one electrical signal that represents system 100 conditions in a predefined manner. Sensing device 102 output is provided as an electrical signal to at least one electronic device 104. Electronic device 104 represents any set of electronic components configured together in a defined manner to perform a dedicated function or set of functions within control system 100. Sensing device 102 is connected to electronic device 104 with a connection 101. Connection 101 may be a wired connection comprised of one or more wires or may be a wireless connection. The electrical signal received by electronic device 104 from sensing device 102 through connection 101 is electrically communicated through an optional filter circuit 106 to a system control device 108. Filter circuit 106 may be a passive or active analog circuit, or may be digital filtering performed by an electronic component other than system control device 108. Filter circuit 106 protects system control device 108 from damage due to electrical interference. System control device 108 optionally also has the capability to control parameters of sensing device 102 through a control circuit 110 over a connection 103. Control circuit 110 may be a passive or active analog circuit, or may be digital control performed by an electronic component other than system control device 108. Connection 103 may be a wired connection comprised of one or more wires or may be a wireless connection.

In an embodiment, system control device 108 may be a computing device. A computing device generally includes applications, which may be software applications tangibly embodied as a set of computer-executable instructions on a computer readable medium within the computing device. The computing device may be any one of a number of computing devices, such as a personal computer, handheld computing device, cellular telephone, embedded microprocessor, etc.

Computing devices may employ any of a number of computer operating systems, including, but not limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices generally each include instructions executable by one or more devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The embodiment of control system 100 shown in FIG. 1 is exemplary only and control system 100 is not limited to the system shown. For example, system control device 108, or other components, may be physically separate from electronic device 104. Furthermore, electronic device 104 is not limited to electrically interfacing with sensing device 102 alone, but may interface with many other devices and systems and provide control for many other devices and systems.

System control device 108 contains a heuristic 109 which is capable of digitally filtering the signal that is output from sensing device 102, received by electronic device 104 and interpreted by system control device 108. Heuristic 109 is not limited to operation within system control device 108. For example, heuristic 109 may alternatively be firmware or software within sensing device 102.

The embodiment of control system 100 shown in FIG. 1 is exemplary only and control system 100 is not limited to the system shown. For example, system control device 108, or other components, may be physically separate from electronic device 104. Furthermore, electronic device 104 is not limited to electrically interfacing with sensing device 102 alone, but may interface with many other devices and systems and provide control for many other devices and systems.

In one embodiment, system control device 108 contains a heuristic 109 which is capable of digitally filtering the signal that is output from sensing device 102, received by electronic device 104 and interpreted by system control device 108. Heuristic 109 is not limited to operation within system control device 108. For example, heuristic 109 may alternatively be firmware or software within sensing device 102.

FIG. 2 describes one embodiment of heuristic 109 in control system 100. The initial portion of heuristic 109 in which current data values are determined (steps 124 and 126) is repeated in as many iterations as are required (defined by steps 120, 122, 128). Iterations are used to acquire data from one or more sensing devices 102, or to acquire data while changing multiple parameters of one or more sensing devices 102, or to acquire data a multiple number of times from a single sensing device 102 without changing parameters, or any combination thereof. Acquired previous and current data values of the signals along with the appropriate counters may be stored for use in later iterations of heuristic 109, or later instantiations of heuristic 109, or for use by other heuristics. Furthermore, the counters and thresholds may be different values during different iterations of heuristic 109. Additionally, although heuristic 109 is described in the following sections with iteration, such iteration may not be required if all of the data may be acquired at one time.

Heuristic 109 starts at iteration one ('1') in step 120. At step 122, heuristic 109 decides whether it has completed all of the required data acquisition iterations. The number of iterations may be a stored value. Alternatively, heuristic 109 may be a software function that is called by another software function and the number of iterations may be passed to heuristic 109 at the call. If, at step 122, heuristic 109 determines that it has finished the requisite number of iterations, heuristic 109 continues at step 134. If the number of iterations is not completed, then heuristic 109 continues at step 124.

At step 124, heuristic 109 determines the current data value of the electrical signal. At step 126, heuristic 109 retrieves a previous data element from compilation 130 which corresponds in some way to the current data value determined in step 124. For example, the previous data value and the current data value may correspond by having been acquired under the same system configuration but at consecutive sample times. Heuristic 109 determines the delta value of the current data as compared to the previous data retrieved from data compilation 130. The delta value is held in data compilation 132. At step 128, the iteration counter is incremented and the data acquisition process continues through the next iteration starting at step 122.

If at step 122, heuristic 109 determines that all iterations are complete, the process continues at step 134. The individual delta values determined within the data acquisition process are compared with each other to check for consistency. The consistency check is to verify that the current data values represent a valid change of conditions over the previous data values according to some predefined set of rules. These rules may include comparing the current data values with several sets of previous data values to determine trends or to keep a moving average of the data or such. If consistency of the delta values is found in step 134, heuristic 109 ends. If there is inconsistency found at step 134, the heuristic continues at step 136, where appropriate remedial measures are taken. Heuristic 109 ends after step 136.

One remedial measure (step 136) may be to disregard and discard the current delta values. Another remedial measure may be to not only disregard and discard the current delta values, but also to monitor the delta values determined over many time periods. For each time period there is a set of delta values. Each set of delta values consists of individual elements. There are corresponding elements within each set of delta values. The evaluation of the elements is monitored across the time periods to see how many times any one particular element in the set of delta values 132 is causing the entire set of delta values to be discarded. Then, if one particular delta element exceeds a threshold number of times of being inconsistent with the rest of the elements, heuristic 109 adapts the system to minimize the acquisition of anomalous data.

Another remedial measure involves discarding only an anomalous delta value instead of discarding an entire set of delta values. The discarded value is then replaced with another value, as described further below. If the discarded value represents an element which has been discarded and replaced more than a threshold number of times, the system automatically adapts to minimize the acquisition of anomalous data.

One option for replacing the discarded value as discussed above is to extrapolate or interpolate a replacement value. The non-anomalous values in the set of delta values are used, along with known relationships between the elements, to extrapolate or interpolate a replacement value for the anomalous value. Another option is to use the non-anomalous values in the delta value set to interpolate a value for the anomalous element, e.g. interpolation from the average of the other non-anomalous values. Yet another option is to use backup data to determine a replacement value for an anomalous element. For example, backup current data values are acquired during the data acquisition iteration phase of heuristic 109. Corresponding backup data values may be maintained in the compilation of previous data values 130. The backup current data values and backup previous data values may be used to determine backup delta values. The backup delta value is then used to replace the discarded anomalous element.

An exemplary control system 100 is a vehicle subsystem having the purpose of identifying the size of the occupant in a seat in order to control the airbag appropriately. When there is no occupant, there may be no airbag deployment. Additionally, for smaller occupants there may be limited deployment. The system may also recognize certain classes of cargo that are placed upon the seat.

FIG. 3 illustrates an exemplary subsystem 400 for determining seat occupant size. A controller 404 commands a sensing device 402 to operate at a given frequency. The sensing device 402 broadcasts a signal at that frequency. A corresponding voltage develops as a function of the size of the occupant. Controller 404 acquires a representation of the voltage, as one point of data relating sensing device operating frequency to output voltage. This data point is compared to a corresponding data point acquired at a previous time, e.g. the current data value of the voltage at the operating frequency is compared with a previously acquired data value of the voltage at the same operating frequency. The change in voltage is the delta value. The controller 404 then commands the sensing device 402 to operate at a next frequency. A next data point is gathered at that frequency and a next delta value is determined. This process is continued until all of the selected frequencies have been stepped through and there is a set of frequency versus delta values compiled. During this process the acquired data goes through digital and/or analog filtering to eliminate or minimize the effect of anomalous data.

Subsystem 400 is not limited to the components shown. For example, there may be several sensing devices 402 or several controllers 404. For another example, controller 404 may be part of the sensing device 402.

In an embodiment of subsystem 400, when an occupant is in the seat, the voltage acquired at all frequencies will be the same within some margin or will vary in a known fashion across frequencies as a function of humidity or other environmental condition. When an occupant enters or leaves the seat, the voltage changes by approximately the same amount at each frequency. If the occupant stays in the seat the voltage at each frequency remains constant.

During actual entrance to or exit from the seat, however, there may be a period of time in which the data is changing inconsistently at different frequencies and correspondingly the delta values are inconsistent with respect to each other. When this occurs, the system recognizes that at least part of the data is untrustworthy and takes some remedy so that false occupant identification does not occur. Additional to delta value inconsistencies resulting from occupant entrance/exit, there may be transient or sustained electrical interference which causes inconsistent delta values. If a single raw voltage value were used to determine seat occupancy, even if it was pre-filtered for noise, it might give misleading information. Even a set of frequency/voltage pairs from one time period may not provide enough information since humidity affects the system more at some frequencies than others. Therefore, the set of delta values gives a much clearer indication of the actual situation, and improved occupant classification may be achieved.

FIG. 4A illustrates in graphical form an exemplary system response of either of the occupant detection system 100 embodiments described above. The vertical axis 1010 of the graph 1000 represents the output level of a sensing device 102. The horizontal axis 1020 of the graph 1000 represents time. Each line 1100 represents sensing device 102 output levels acquired for one frequency over time. Six different lines 1100 are shown, representing six different frequencies. The line 1100 levels throughout time duration 1030, in which the levels are in a high state, indicate that the seat is occupied. The line 1100 levels throughout time duration 1040, in which the levels are in a low state, indicate that the seat is unoccupied. It is evident that the output levels acquired are consistent between frequencies, i.e. all signals move together. Control system 100 uses this consistency of the signals to determine when seat occupancy is changing.

FIG. 4B illustrates in graphical form an exemplary system response of an occupant detection system 100 in the presence of electrical interference. The vertical axis 1015 of graph 1500 represents the output level of a sensing device 102. The horizontal axis 1025 of graph 1500 represents time. Each line 1151-1157 represents sensing device 102 output levels acquired for one frequency over time. Seven different lines 1151-1157 are shown, representing seven different frequencies. Graph 1500 represents an unoccupied seat. For all times shown on graph 1500, lines 1151-1155 are in a steady state. However, lines 1156-1157 generally show an increase in value. Control device 108 with heuristic 109 recognizes that some of the lines 1151-1157 are not consistent with the others. Because of this inconsistency, control device 108 determines that the frequencies represented by lines 1156-1157 are affected by electrical interference, either environmental noise or the noise generated at the start of entering the seat. The control device 108 therefore determines that the change of level from low to high on lines 1156-1157 does not indicate a change of occupancy.

FIG. 5 details the data determined for the system of FIG. 4 using heuristic 109. Data sets 450, 452 and 454 represent the current data values determined at times t1, t2 and t3 respectively. As new current data values are determined, the data values which were current in the previous time period become a set of previous data values. For example, 450 is the previous data value set for 452, and 452 is the previous data value set for 454. Sets 456, 458 and 460 of delta values are determined by comparing the corresponding current and previous data value sets. For example, 458 is the delta set for the comparison of 450 and 452, and 460 is the delta set for the comparison of 452 and 454.

At each time t, the five delta values are compared against each other. For example, at time t2 the delta value set 458 consists of the five elements $\Delta\_t12\_f1$, $\Delta\_t12\_f2$, $\Delta\_t12\_f3$, $\Delta\_t12\_f4$ and $\Delta\_t12\_f5$ corresponding to the differences in acquired signals measured in times t1 and t2 at frequencies f1-f5 respectively. These five elements must all be within some threshold value of each other, i.e. the data values must have changed consistently across frequencies between time t1 and t2. If they have not, the system must create a remedy for the inconsistency. If the inconsistency continues, a different remedy may be necessary. For example, if there is inconsistent data at one frequency for more than a threshold number of samples, the system 100 may adjust the frequency of the sensor 102. If the heuristic 109 determines that the delta values are consistent, the current data values are passed through a lag filter, in which the time constant is slow or fast based on how fast the signal level is changing.

Subsystem 400 is just one example of how system 100 may be used. System 100 is not limited to the automotive environment or transportation in general. System 100 is also not limited to the components shown in the figures. Heuristic 109 is not limited to the steps shown. One skilled in the art will recognize that there are many ways to implement system 100 and that there are many ways to implement heuristic 109.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An occupant detection system comprising:
   at least one sensing device disposed in a seat, wherein the sensing device is configured to detect signals at an operating frequency;
   an electronic device configured to acquire data from the at least one sensing device, wherein the data is indicative of a signal value at the operating frequency, wherein the electronic device acquires a first set of data and a second set of data during a first time period and second time period distinct from the first time period, each set of data comprising data acquired in at least two sensing device configurations characterized as detecting signals at distinct operating frequencies, wherein the first set of data and second set of data are compared to each other to create a set of change data having an individual element for each operating frequency; and
   a heuristic configured to determine anomalous acquired data by comparing the individual elements for each operating frequency within the set of change data to each other.

2. The system of claim 1 wherein the individual elements within the set of change data are compared to each other by determining whether all elements have an appropriate relationship to each other according to a predefined formula.

3. The system of claim 2 wherein the relationship between the elements is that the values of all of the elements are equal to each other within a predefined range.

4. The system of claim 2 wherein an element of the set of change data which does not have an appropriate relationship to the other elements is modified to have the appropriate relationship.

5. The system of claim 4 wherein the element is modified based on a known relationship between the elements in the set of change data.

6. The system of claim 5 wherein the element is modified based on interpolation of the values of the other elements in the set of change data.

7. The system of claim 5 wherein the element is modified based on extrapolation from the values of the other elements in the set of change data.

8. The system of claim 2 wherein the element not having an appropriate relationship to the other elements is replaced with data that was acquired as a backup.

9. The system of claim 1 wherein the electronic device acquires subsequent sets of data and the sets of acquired data are compared to each other to create subsequent sets of change data.

10. The system of claim 9 wherein an anomalous element in the first set of change data is compared with the corresponding element in other sets of the subsequent sets of change data to determine if the anomalous element consistently represents anomalous data.

11. The system of claim 10 wherein if an element consistently represents anomalous data, the system automatically adapts by changing the configuration of the system.

12. The system of claim 11 wherein the system configuration is changed by modifying the operating frequency of the sensing device.

13. A method of detecting an occupant of a seat, comprising the steps of:
providing an occupant detection system including at least one sensing device disposed in a seat, wherein the sensing device is configured to detect signals at an operating frequency, and an electronic device configured to acquire data from the at least one sensing device, wherein the data is indicative of a signal value at the operating frequency;
acquiring a first set of data which includes at least two elements, the at least two elements corresponding to the response of the system when the sensing device is configured differently for acquisition of each of the at least two elements at distinct operating frequencies;
acquiring a second set of data which includes at least two elements, the at least two elements corresponding to the response of the system when the sensing device is configured differently for acquisition of each of the at least two elements at the distinct operating frequencies; wherein each element of the first data set is acquired at the same distinct operating frequencies as a corresponding element of the second data set;
comparing the individual elements of the first data set to the corresponding individual elements of the second data set to create a first set of change data;
comparing the elements within the first set of change data to each other to identify anomalous data.

14. The method of claim 13 further comprising creating at least one subsequent set of change data according to the method used to create the first set of change data.

15. The method of claim 14 further comprising comparing the elements of the first set of change data to the elements of the at least one subsequent set of change data to identify elements which consistently have anomalous values across the selected sets of change data.

16. The method of claim 15 further comprising adapting the system automatically when an element with consistently anomalous values is identified.

17. The method of claim 16 wherein adapting the system automatically is accomplished by changing the operating frequency of a device used within the system for acquiring data.

18. The method of claim 13 wherein identifying anomalous data includes comparing the elements of the first set of change data to each other to check for consistency according to a predefined relationship.

19. The method of claim 15 wherein identifying elements which consistently have anomalous data includes checking for consistency according to a predefined relationship.

20. The method of claim 13 further comprising replacing an anomalous data element of the first set of change data with a value determined from the values of the other elements in the first set of change data according to a predefined relationship.

21. The method of claim 13 further comprising replacing an anomalous data element of the first set of change data with a value interpolated or extrapolated from the values of the other elements within the first set of change data.

22. The method of claim 14 further comprising replacing an anomalous data element of the first set of change data with a value interpolated or extrapolated from values of the corresponding elements in at least one of the at least one subsequent set of change data.

* * * * *